(12) United States Patent  
Palmer

(10) Patent No.: US 8,532,866 B1
(45) Date of Patent: Sep. 10, 2013

(54) CONCURRENT VEHICLE DATA PORT COMMUNICATION SYSTEM

(76) Inventor: Brian Palmer, Orem, UT (US)

( * ) Notice: Subject to any disclaimer, the term of this patent is extended or adjusted under 35 U.S.C. 154(b) by 141 days.

(21) Appl. No.: 13/112,402

(22) Filed: May 20, 2011

(51) Int. Cl.
*G01M 17/00* (2006.01)

(52) U.S. Cl.
USPC ........................................................ 701/29.1

(58) Field of Classification Search
USPC ................ 701/22, 29.1, 29.6, 33, 33.2, 33.4, 701/34, 34.3, 34.4, 36, 484; 455/73, 90.1, 455/507, 509, 510, 512, 513; 375/219, 220; 710/62, 72, 73; 370/395.41, 395.42, 442, 370/443, 444
See application file for complete search history.

(56) References Cited

U.S. PATENT DOCUMENTS

2008/0140281 A1* 6/2008 Morris et al. .................... 701/33
2011/0258044 A1* 10/2011 Kargupta .................... 705/14.49
2011/0313593 A1* 12/2011 Cohen et al. ...................... 701/2
2012/0106342 A1* 5/2012 Sundararajan et al. ....... 370/235

OTHER PUBLICATIONS

SAE J1850 Jun. 2006 (saej1850v004.pdf).
SAE J1962 Apr. 2002 (saej1962v003.pdf).
SAE J1978 Apr. 2002 (saej1978v003.pdf).
SAE J1979 May 2007 (saej1979v003.pdf).
SAE J2178-1 Jul. 2004 (saej2178-1v003.pdf).
SAE J2178-2 Jul. 2004 (saej2178-2v003.pdf).
SAE J2178-3 Jul. 2004 (saej2178-3v004 pdf).
SAE J2178-4 Jul. 2004 (saej2178-4v003 pdf).
SAE J2190 Jun. 1993 (saej2190v001 pdf).
SAE J2534-1 Dec. 2004 (saej2534-1v002.pdf).
SAE J2534-2 Mar. 2006 (saej2534-2v001 pdf).
KWP 2000/14230-1 Oct. 1997 (14230-1s.pdf).
KWP 2000/14230-2 Apr. 1997 (14230-2s.pdf).
KWP 2000/14230-3 Feb. 2000 (14230-3s.pdf).
ISO 9141-2 Feb. 1994 (1509141-2_1994 pdf).
ISO 9141 AN602 by John Bendel Apr. 1996 (iso9141_an602.pdf).
ISO 15765-4 Jan. 2005 (ISO_15765-4_2005.pdf).
ISO/DIS 13400-1 Sep. 2010/Feb. 2011 (ISO_DIS_13400-1.pdf).
ISO/DIS 13400-2 Sep. 2010/Feb. 2011 (ISO_DIS_13400-2.pdf).
ISO/DIS 13400-3 Sep. 2010/Feb. 2011 (ISO_DIS_13400-3.pdf).

* cited by examiner

*Primary Examiner* — Mary Cheung
*Assistant Examiner* — Rodney Butler
(74) *Attorney, Agent, or Firm* — ColterJennings

(57) ABSTRACT

A method of concurrently communicating data from a vehicle data port to a plurality of computing devices includes a transceiver that handles a plurality of requests from a plurality of independent computing devices. The transceiver is connected to the vehicle data port either directly or indirectly through a pass-thru interface. The plurality of computing devices may each send separate (that is, independent and diverse) requests for data or communications to the vehicle through the transceiver. The transceiver maintains a queue of communications requests from each computing device and orders and sequences the vehicle communications so that timing requirements are properly met and collisions and other types of problems are avoided. The transceiver may also handle duplicative requests by sending only one request to the vehicle data port but providing responses to each requesting computing device.

20 Claims, 4 Drawing Sheets

CONCURRENT VEHICLE DATA PORT COMMUNICATION SYSTEM

BACKGROUND

This application relates generally to a method for concurrent communication of dynamic vehicle telemetry between a transceiver connected to a vehicle data port and a plurality of computing devices, such as a desktop computer or hand-held device, and in particular to a method of concurrently providing motor vehicle data to a plurality of users using a heterogeneous group of user devices, while allowing each user to customize the data displayed on the user's device.

Since 1996, every passenger car and light-duty truck sold in the United States has had a computer diagnostic port, called an OBD-II port or an SAE-J1962 port. This diagnostic port permits a mechanic or other user to connect to the vehicle and retrieve vehicle telemetry, that is, data about the vehicle, including engine, fuel system, brake system, and other data. Software has been developed to permit mechanics and automobile enthusiasts to develop graphical programs for displaying the telemetry data on a computer display.

Traditionally, vehicle data ports and diagnostic systems have been designed around a model of a single external device (or "scan tool") connected to a vehicle at one time. If a dashboard display device is already connected to the vehicle data port and a user wanted to plug in a separate scan tool, the user either had to unplug the dashboard display device, or somehow split the wires so that a second device can be connected. In fact, many companies currently sell vehicle data port splitters (or "Y-cables").

In most cases, these types of arrangements are constructed so that multiple devices are physically connected to (or in electrical communication with) the vehicle data port, but typically only one device is actively communicating with the vehicle at any given time, while one or more other devices are in a monitor-only mode, without active bidirectional communication directly with the vehicle. This way, the vehicle maintains bidirectional communication with only a single device at a time. Often, that connected device has no knowledge that other external devices are also monitoring communications from the vehicle.

Using a splitter or "Y-cable" with more than one device concurrently communicating with vehicles today causes a number of problems. It is widely assumed that only one device will be communicating with the vehicle at once, and some vehicles even enforce this by only responding to data requests from a single address. In fact, newer vehicle data protocols have standardized on this practice by assigning external equipment only a single allowable address range. If more than one device concurrently communicates with the vehicle, these protocols cause addressing conflicts, data collisions, timing violations and other kinds of related data acquisition problems.

In the past, the multiple connected device usage has been mostly limited to the scan tool designers who occasionally want to connect a second device using a "Y-cable" to monitor the requests they transmit to verify conformance or to monitor and debug the scan tool communications. However, contrary to much of the prevailing wisdom in this area, the ability to have concurrent users all communicating with the same vehicle has definite advantages. Thus, development of such a system while staying compliant with existing vehicle protocols, which were typically not designed with multiple concurrent connections in mind, could be very useful.

SUMMARY

The present system and method allows for concurrent communication and acquisition of dynamic vehicle telemetry data by a plurality of computing devices, such as computer monitors, hand-held devices, data logging and storage systems, external vehicle test equipment, scan tools, code readers, or other devices. The system communicates with the vehicle through the vehicle data port, such as the OBD-II port. A plurality of independent user computing devices are able to connect to a transceiver and send and receive communication from the transceiver, and also may request data from the vehicle or send and receive other types of vehicle communications. The specific requested data may be unique to the computing device or may overlap with the set of data requested by other computing devices, and is provided to the requesting computing device.

The system includes a transceiver connected directly (or indirectly using a pass-thru interface box or other means of wired or wireless electrical communication) to the vehicle data port. The transceiver communicates with the vehicle through the vehicle data port. The transceiver also communicates with each of the computing devices. As data or other communications becomes available from the vehicle, the transceiver pulls that data off the vehicle data port and provides it to any of the computing devices whose users may have requested such data. In some embodiments, the system even permits computing devices to provide commands through the communications path to the vehicle. The data is provided to the computing device and may be displayed on the computing device's own display device, logged by the computing device, or used in other ways. Each user of a computing device may or may not be aware that multiple users are concurrently communicating with the vehicle.

BRIEF DESCRIPTION OF THE DRAWINGS

Other features and advantages of the present method will be apparent from the following Detailed Description taken in conjunction with the accompanying Drawings, in which.

DETAILED DESCRIPTION

Modern vehicles typically have a data port, such as an On-Board Diagnostics II port ("OBD-II port"). In prior systems, a single device connected to the vehicle data port permitted a single user to communicate with the vehicle through the data port. According to the present method, a system is provided that permits several users concurrently to communicate with a single vehicle data port.

Figure 3:
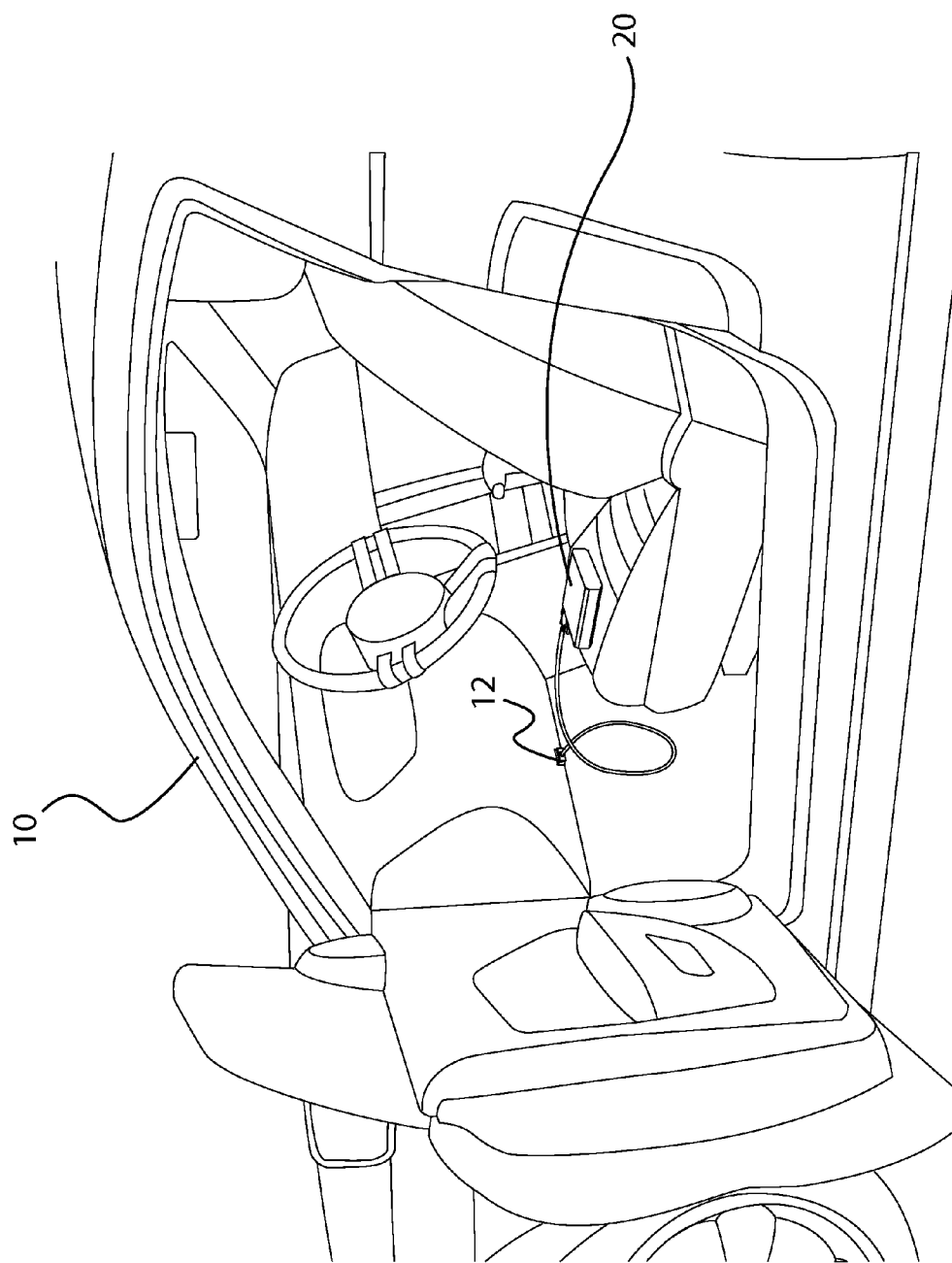
FIG. 3 depicts a transceiver directly connected to the vehicle port.
Figure 4:
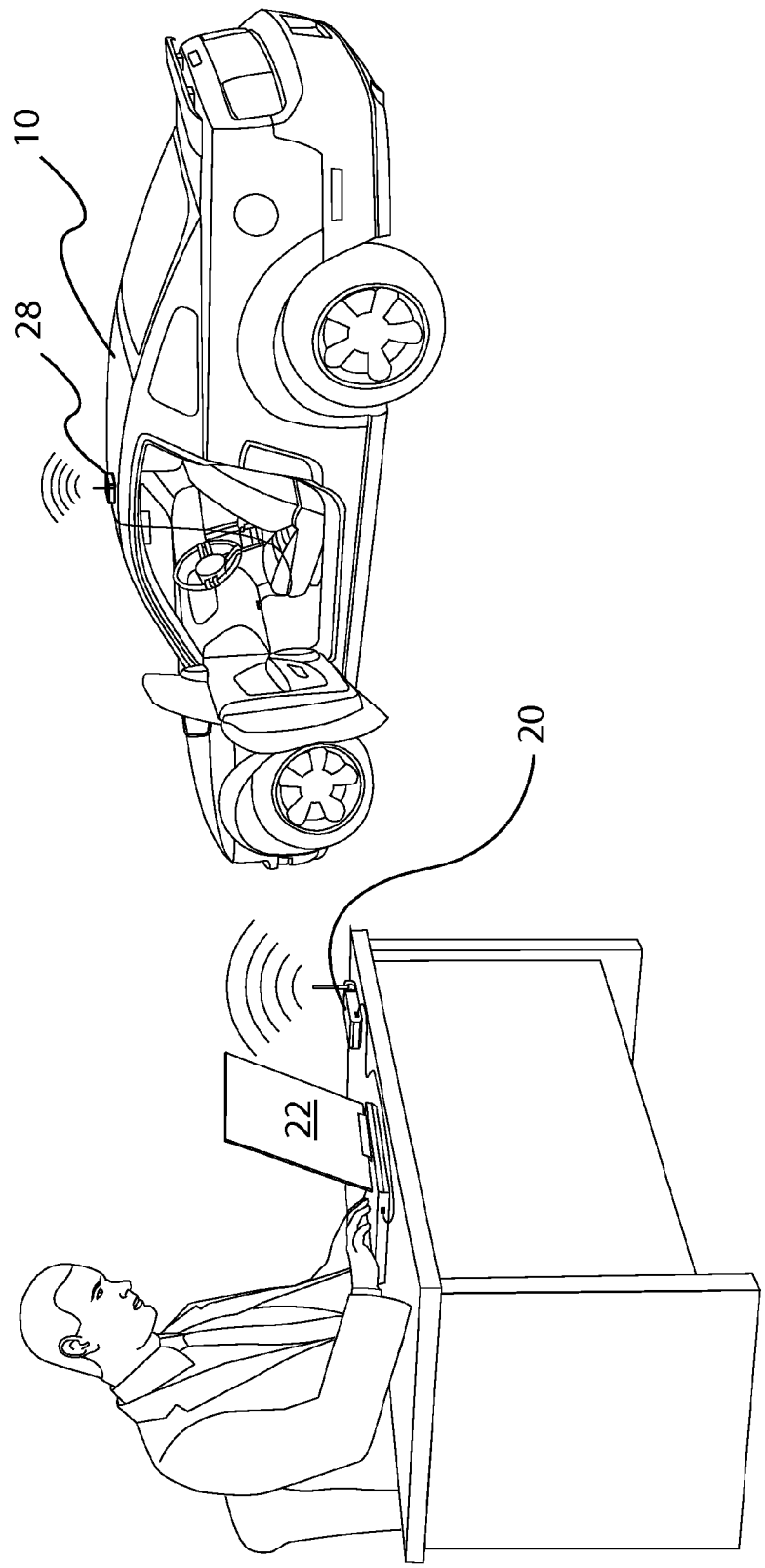
FIG. 4 depicts a transceiver communicating with a vehicle using a wireless pass thru hardware interface box, so that the vehicle may be physically located in a remote location.

As depicted in FIGURES, a vehicle 10 includes at least one vehicle data port 12, which is typically an OBD-II port but may be other data ports. In the embodiment depicted in FIG. 2, a pass-thru interface 14 connects to the data port 12 through a cable 16, and a second cable 18 connects the pass-thru interface to an intelligent data transceiver 20. In the embodiment depicted in FIG. 3, the transceiver 20 is directly connected to the data port 12. In the embodiment depicted in FIG. 1, the transceiver 20 is directly connected to the data port 12, and an independent user computing device 22 is connected to the transceiver using a communications cable 24. In the embodiment depicted in FIG. 4, a wireless pass-thru interface 28 is connected to the transceiver 20, and a user device 22 is connected to the transceiver 20.

Figure 1:
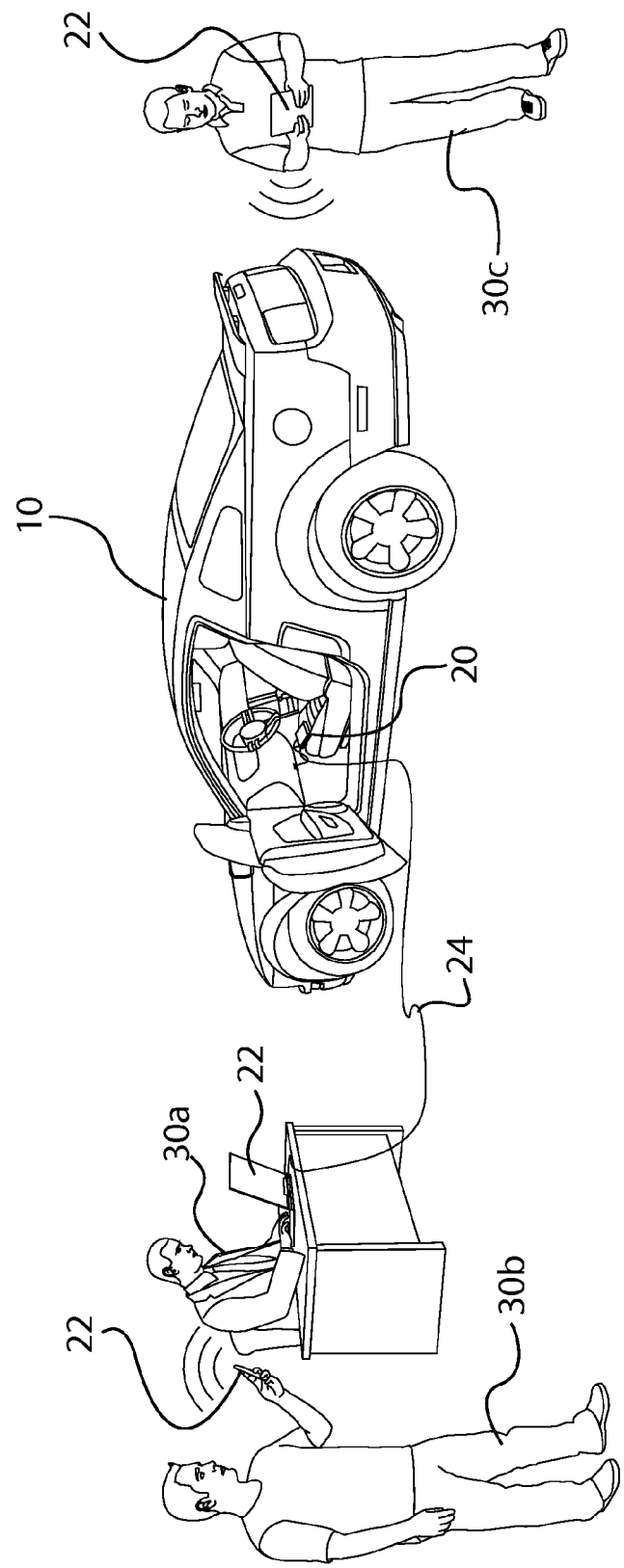
FIG. 1 depicts a perspective view of several users concurrently communicating with a single vehicle data port using a variety of display devices and both wired and wireless communications.
Figure 2:
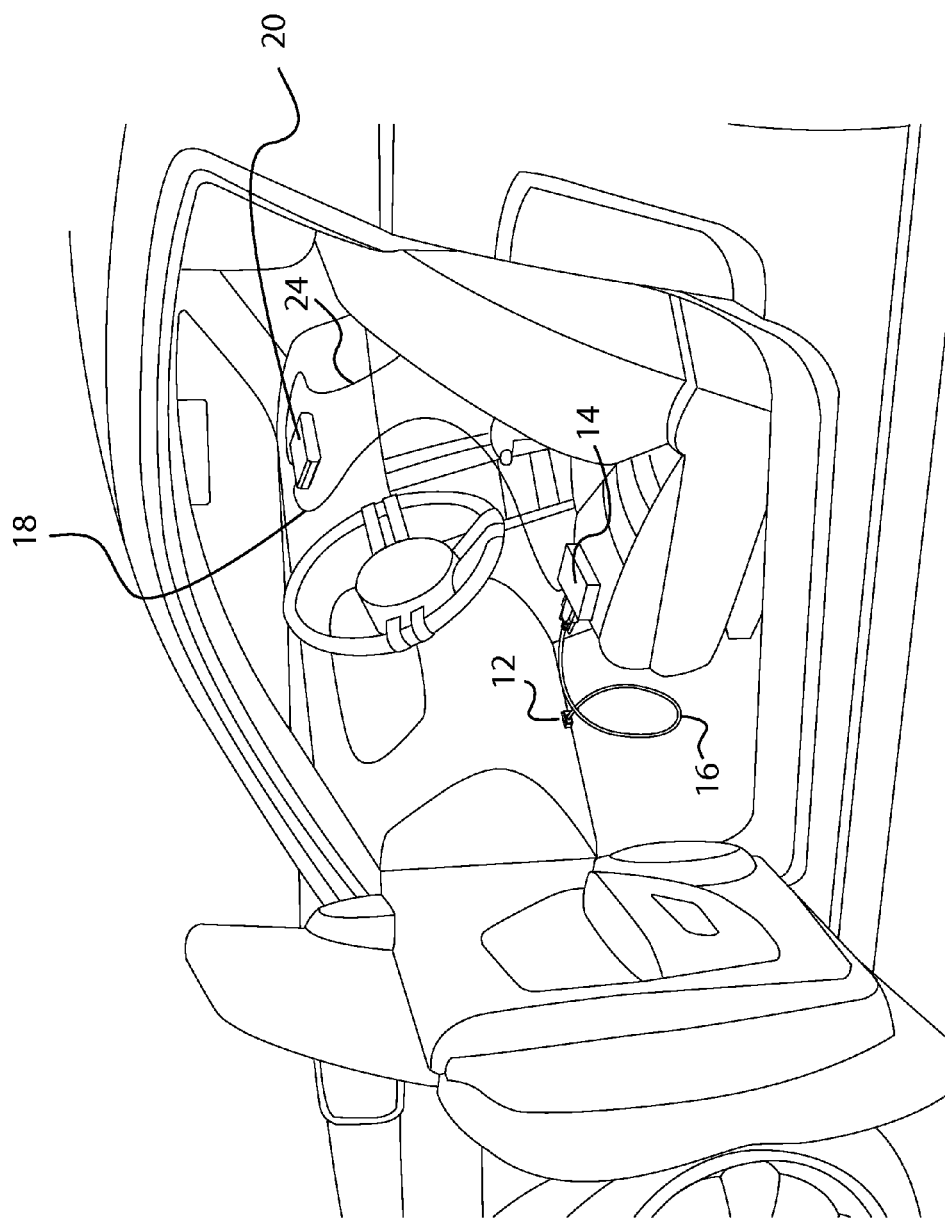
FIG. 2 depicts a partial perspective view of the interior of a vehicle showing a transceiver connected to the vehicle data port using a wired pass thru hardware interface box.

The transceiver 20 may be any of a number of devices, such as a specialized transceiver or a laptop computer with specialized software and communications protocols loaded thereon. As depicted in FIGS. 1 and 2, the transceiver 20 may have a wired communications cable 24 attached thereto, which communications cable may then connect to a computing device 22. The pass-thru interface 14 and the wireless pass-thru interface 28 may be any of those known in the art, such as those incorporating the ELM327 chip-set or J2534 compatible devices. The wireless communication can use any of those available, including Bluetooth, 802.11 (WiFi), RF, or other wireless protocols known in the art.

As depicted in FIG. 1, the present system permits several independent user computing devices 22 concurrently to communicate with the vehicle 10 through the data port 12 using a variety of individual independent computing devices 22. The transceiver 20 communicates with each of the independent computing devices 22 using the software and communications protocols. This communication may be wireless or may pass over wires such as the communications cable 24. For example, in FIG. 1, one user 30a communicates through the cable 24, whereas the other users 30b and 30c communicate wirelessly. The communications between the devices 22 and the transceiver 20 may be bidirectional, and thus each device 22 may concurrently request and acquire any of the disparate types of vehicle diagnostic data available through the data port 12 from the vehicle 10 in real time, that is, as that data is generated and made available.

The transceiver 20 is designed to permit connection and disconnection from the vehicle data port 12. The communications protocol contained in the programming of the transceiver distributes the vehicle data to the various user computing devices 22. The transceiver streams various types of vehicle data in real time to whichever of the independent computing devices has requested such data.

The transceiver 20 may accept instructions or commands from each of the computing devices 22. These commands typically are requests for specific types of vehicle data, for example vehicle engine rpm, fuel level, temperature, or any of the other data or commands available from the vehicle data port 12. However, other commands may also be made, such as opening or closing the connection to the vehicle data port or reading trouble code data or making requests for other data from the vehicle or sending command codes, such as those that lock or unlock the torque converter or roll down a window or lock or unlock doors or honk the horn or test the headlights or actuate other vehicle systems.

The transceiver 20 passes those commands on to the vehicle data port 12. As the requested commands are performed or data is collected, the vehicle data port passes that information to the transceiver, which in turn makes that information available to the computing devices 22 that requested that information. Computing devices 22 that have not requested certain information are typically not provided with that information, but may be provided with other requested information. Thus, each device is typically only provided with the subset of information that the user of that device has requested. However, in other embodiments, the system may be configured to provide each user or device the entire set of data, including data or communications not specifically requested by that device.

The actual data transmission may be directed to the computing devices 22 in various ways. For example, in one embodiment, the transceiver 20 may identify the computing device requesting a certain set of data, and when transmitting that data, the transceiver may selectively direct that data to the specific device, such as by addressing the device in the protocol. In another embodiment, the transceiver 20 may be configured to broadcast all of the data that has been requested by all of the connected computing devices 22, and the respective computing devices 22 would then handle the data based on its own set of filters and uses.

There may be various ways for a computing device 22 to connect to the transceiver 20. In one embodiment, a specialized protocol built on the TCP protocol (or another communications protocol such as UDP) effects the communication. The specialized protocol is designed to handle the communications specific to the system, such as establishing a connection between a computing device 22 and the transceiver 20 or specifying the types of communications data to be transmitted between the computing device 22 and the vehicle 10.

For example, a given computing device 22 may connect using the transceiver 20 (and, in some embodiments, the pass-thru interface 14 or 28) to the vehicle data port 12 and request certain data, such as engine RPM, temperature, and vehicle speed. The transceiver 20 prioritizes and sequences the requests from all the connected computing devices 22 so that it can maintain compliance with existing standardized vehicle data port protocols. The importance of this step is emphasized by the fact that certain existing vehicle data port protocols require that certain requests be handled in a specific manner, such as by requiring a wait time after receipt of one request and before accepting another request. Other existing vehicle protocols may close the connection if requests are not transmitted to the vehicle data port properly. These sorts of conflicts may be difficult to avoid if the communications involve such prior systems as using a splitter (or Y) cable. Thus, the specialized protocol is designed to manage these sorts of conflicts.

In one embodiment, the transceiver 20 can accept concurrent connections from the plurality of computing devices 22 over TCP/IP sockets. The devices 22 are then able to connect to the transceiver 20 using TCP/IP from anywhere in the world, over both wired and wireless connections. In other embodiments, this is further enhanced to accept connections using other protocols such as Bluetooth, RS232, and USB.

Vehicle communications may be opened and closed by the transceiver 20 or by a request from a computing device 22 over the communications protocols. When a computing device first establishes a connection to the transceiver, there is an authentication or handshake used to determine what protocol features are supported by both sides and a protocol version is agreed upon. This allows for backwards compatibility even when the computing device 22 supports newer or older protocol features than the transceiver 20 or other concurrently connected computing devices.

In one embodiment, the transceiver 20 is configured with a pre-defined set of supported vehicle data items that each computing device 22 may request from the vehicle 10. In this mode, the transceiver may already be actively performing vehicle communications for these pre-defined data items, so that the data is ready once a computing device requests it. In other embodiments, the individual computing devices may configure the transceiver with data items or other types of vehicle communications or commands that the transceiver did not already have pre-defined. Thus, the system provides flexibility in use.

The specialized protocol allows for each computing device 22 to request, or poll, each vehicle data item at any time. The specialized protocol also allows for each computing device 22 to select a data set to be obtained using vehicle communications sent automatically or in an ongoing fashion by the transceiver 20 and streamed from the transceiver 20 to the computing devices as soon as the vehicle data is available, without having to make an explicit request each time a new data sample is wanted. Thus, different computing devices may be concurrently requesting, polling, or receiving different or even overlapping subsets of vehicle data from the transceiver 20. The transceiver manages the communication link with the vehicle 10 and delivers configured data items to and from the computing devices.

As mentioned, the transceiver 20 maintains a queue of pending (and ongoing) communications requests from each computing device 22 and orders and sequences the vehicle communications so that timing requirements are properly met and collisions and other types of problems are avoided. The transceiver 20 may include a cache of vehicle communications or data available to computing devices that do not necessarily need or want to make a new request for certain data. In such a case, the transceiver requests uncached data from the vehicle data port 12 as needed by the users.

The transceiver 20 may also incorporate a system where during the processing, ordering, and sequencing of vehicle communications from the plurality of concurrently connected computing devices 22, the transceiver may be configured to identify certain vehicle communications requests from one computing device as duplicative or redundant of vehicle communications requests from another computing device. If such a duplicate or redundant vehicle communications request is found, the transceiver may send a single communications request to the vehicle and provide the response to more than one concurrently connected computing device. The transceiver may include a graphical display, for example where a computer laptop has specialized software enabling it to act as a transceiver, so that a user may use either that laptop acting in the capacity of a computing device 22 (as well as acting in the capacity of the transceiver) or another computing device 22 connected to that laptop, which again acts in the capacity of the transceiver.

According to one embodiment, the various computing devices 22 are configured to communicate with the transceiver 20 using a set of specialized protocols used by that transceiver. According to another embodiment, the computing devices 22 use the same protocols employed by the vehicle data port 12. In this embodiment, the transceiver 20 manages the communications with each of the respective computing devices 22, for example by identifying each communication as being associated with a specific computing device. The transceiver receives the data requests from the respective computing devices, provides the data request to the vehicle data port (either directly or through a pass-thru interface 14 or 28, depending on the specific system in use), and identifies the response (from the vehicle data port) to each communication with the respective computing device, so that the computing devices each receive proper responses to the respective data requests made by that computing device. In effect, the transceiver translates communications between the computing devices 22 and the vehicle data port 12, thereby emulating a single vehicle data port from the "perspective" of each computing device, and emulating a single computing device from the "perspective" of the vehicle data port. As a result, in this embodiment the computing devices may communicate with the vehicle data port through the transceiver with minimal or no additional adaptation or configuration of the computing devices.

The connection between the transceiver 20 and a computing device 22 may also close. Closing may be the result of a choice to close, or the result of a dropped connection, or other factors. Upon close of a connection, the transceiver 20 re-prioritizes and re-sequences the vehicle communications, so that requests from the computing device relating to the closed connection no longer consume available bandwidth and resources.

The present method allows a plurality of concurrent users to communicate with the vehicle over the vehicle data port, all in real time. Thus, the present invention has several advantages over the prior art. It will be obvious to those of skill in the art that the invention described in this specification and depicted in the FIGURES may be modified to produce different embodiments of the present invention. Although embodiments of the invention have been illustrated and described, various modifications and changes may be made by those skilled in the art without departing from the spirit and scope of the invention.

The invention claimed is:

1. A method of placing a plurality of independent computing devices in concurrent communication with a single vehicle data port comprising the steps of:
   connecting a transceiver in electrical communication with the vehicle data port, the transceiver configured to organize and synchronize vehicle communication requests from the plurality of independent computing devices and to communicate those vehicle communication requests and responses to those vehicle communication requests to and from the vehicle data port in real time;
   opening connections between the transceiver and the plurality of computing devices;
   concurrently passing a plurality of vehicle communication requests from the plurality of computing devices to the transceiver, upon receipt of which the transceiver processes, prioritizes and sequences the requests in compliance with predetermined vehicle protocol requirements;
   sending processed requests to the vehicle data port so that the vehicle may operate on the processed requests and passing back to the transceiver any vehicle communications that incorporate data from the vehicle and are responsive to the processed requests; and
   selectively transmitting the responsive vehicle communications from the transceiver to the plurality of computing devices based on which of the plurality of computing devices requested which portions of the responsive vehicle communications;
   the transceiver being further configured to identify duplicative requests from the plurality of computing devices, send a single communications request to the vehicle, and provide a response to more than one computing device.

2. The method of claim 1 in which the transceiver is further configured to allow connection and disconnection from the vehicle data port.

3. The method of claim 1 further comprising use of a communications protocol to distribute the vehicle data to the plurality of computing devices.

4. The method of claim 1 further comprising the step of streaming the vehicle data in real time to at least one of the plurality of independent computing devices.

5. The method of claim 1 further comprising the step of providing the vehicle data to at least one of the plurality of independent computing devices in response to a vehicle data request from that independent computing device.

6. The method of claim 1 in which the transceiver is configured to permit the plurality of independent computing devices concurrently to acquire different subsets of vehicle data.

7. The method of claim 1 in which the transceiver maintains a cache of vehicle communications data to permit the plurality of independent computing devices concurrently to acquire certain pieces of vehicle data without waiting for new vehicle communications to take place.

8. The method of claim 1 in which the transceiver is provided as original equipment in the vehicle.

9. The method of claim 1 in which the transceiver is provided as an after-market item for the vehicle.

10. The method of claim 1 in which the electrical communication between the transceiver and the vehicle data port is a direct connection.

11. The method of claim 1 in which the electrical communication between the transceiver and the vehicle data port includes a pass-thru hardware interface.

12. The method of claim 1 in which the electrical communication between the transceiver and the vehicle data port is a wireless connection.

13. The method of claim 1 in which the transceiver is configured to translate vehicle communications protocols such that the plurality of independent computing devices behave as though communicating directly with the vehicle data port without additional adaptation to the computing devices.

14. The method of claim 1 in which the transceiver includes a graphical display or other user interface.

15. A method of placing a plurality of independent computing devices in concurrent communication with a single vehicle data port comprising the steps of:

connecting a transceiver in electrical communication with the vehicle data port, the transceiver configured to organize and synchronize vehicle communication requests from the plurality of independent computing devices and to communicate those vehicle communication requests and responses to those vehicle communication requests to and from the vehicle data port in real time;

opening connections between the transceiver and the plurality of computing devices;

concurrently passing a plurality of vehicle communication requests from the plurality of computing devices to the transceiver, upon receipt of which the transceiver processes, prioritizes and sequences the requests in compliance with predetermined vehicle protocol requirements, which vehicle protocol requirements were originally configured to assume communication with only a single computing device;

sending processed requests to the vehicle data port so that the vehicle may operate on the processed requests and passing back to the transceiver any vehicle communications that incorporate data from the vehicle and are responsive to the processed requests; and selectively transmitting the responsive vehicle communications from the transceiver to the plurality of computing devices based on which of the plurality of computing devices requested which portions of the responsive vehicle communications.

16. The method of claim 15 further comprising the step of streaming the vehicle data in real time to at least one of the plurality of independent computing devices.

17. The method of claim 15 in which the transceiver maintains a cache of vehicle communications data to permit the plurality of independent computing devices concurrently to acquire certain pieces of vehicle data without waiting for new vehicle communications to take place.

18. The method of claim 15 in which the transceiver comprises at least one of original equipment in the vehicle or an after-market item for the vehicle.

19. The method of claim 15 in which the transceiver is configured to translate vehicle communications protocols such that the plurality of independent computing devices behave as though communicating directly with the vehicle data port without additional adaptation to the computing devices.

20. The method of claim 15 in which the transceiver includes a graphical display or other user interface.

\* \* \* \* \*